United States Patent
Chhabra et al.

(10) Patent No.: US 8,776,086 B1
(45) Date of Patent: Jul. 8, 2014

(54) AGENT MANAGEMENT FRAMEWORK

(75) Inventors: Nitin Chhabra, Bangalore (IN); Nithin Surendran, Calicut (IN); Ankur Dixit, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 176 days.

(21) Appl. No.: 13/414,896

(22) Filed: Mar. 8, 2012

(51) Int. Cl.
*G06F 3/00* (2006.01)
*G06F 15/177* (2006.01)

(52) U.S. Cl.
USPC ........... 719/317; 719/331; 719/311; 709/220; 715/735

(58) Field of Classification Search
CPC ..... H04L 63/20; H04L 2209/76; H04L 51/14; H04L 67/16; H04L 67/18; H04L 41/046; H04L 63/102; H04L 67/10; H04L 67/2814; H04L 67/306; H04L 41/0803; H04L 41/0806; H04L 41/0853; H04L 12/12
See application file for complete search history.

(56) References Cited

U.S. PATENT DOCUMENTS

| | | | |
|---|---|---|---|
| 8,219,682 B2 | 7/2012 | G et al. | |
| 2002/0019864 A1* | 2/2002 | Mayer | 709/220 |
| 2003/0188040 A1* | 10/2003 | Vincent | 709/317 |
| 2003/0234808 A1* | 12/2003 | Huang et al. | 715/735 |
| 2004/0216126 A1* | 10/2004 | Hiltgen | 719/311 |
| 2006/0155738 A1* | 7/2006 | Baldwin et al. | 707/101 |
| 2009/0037934 A1* | 2/2009 | Sullivan | 719/317 |
| 2009/0183162 A1* | 7/2009 | Kindel et al. | 718/103 |
| 2010/0057443 A1* | 3/2010 | Di Cristo et al. | 704/9 |
| 2010/0175134 A1* | 7/2010 | Ali-Ahmad et al. | 726/24 |

OTHER PUBLICATIONS

"Integrating Tools and Infrastructures for Generic Multi-Agent Systems", Gutknecht, 2001, pp. 1-8.*
"A System Integration Oriented Multi-Agent Hierachy Cooperation Model", Hao, 2008, pp. 1-4.*

* cited by examiner

*Primary Examiner* — Tuan Dao
(74) *Attorney, Agent, or Firm* — BainwoodHuang (57) ABSTRACT

Various embodiments implement agents as dynamically linked libraries to run within host processes controlled by an executable agent manager. The agent manager runs as a service or daemon continuously after being loaded into the memory of a computer system. Information concerning agents that are configured to carry out tasks on the computer system is stored in a database accessible to the agent manager. When a task that a particular agent is configured to carry out needs to be done, the agent manager assigns an executable host process to run the agent. The agent manager then sends start and stop commands to the host process to load and halt the agent, respectively.

18 Claims, 5 Drawing Sheets

|  | | 36a | 36b | 36c |
|---|---|---|---|---|
|  | | Depends from | Depended on by | Hierarchal Level |
| 34a | Agent A |  |  | 1 |
| 34b | Agent B |  | Agent C | 1 |
| 34c | Agent C | Agent B | Agent D | 2 |
| 34d | Agent D | Agent C |  | 3 |

AGENT MANAGEMENT FRAMEWORK

BACKGROUND

Agents are software programs that perform tasks on a computer system without user intervention. One example set of agents works with a storage environment, each agent running concurrently and performing tasks such as managing driver license levels, configuration files, and databases. An example of such a set of agents is included in EMC Powerpath®; these agents run on Microsoft Windows® as a service.

Conventional agents running as services on Microsoft Windows®, or as daemons in Unix®-type environments, are typically loaded into memory at boot time and are run continuously throughout a user session. For example, agents are loaded into memory as part of the boot sequence and the agents begin performing their respective tasks continually and without user intervention.

Being services or daemons, conventional agents are implemented as executable files. In this way, the conventional agents each occupy their own memory space during their respective runs as services or daemons.

SUMMARY

Unfortunately, there are deficiencies with conventional agents. For example, a computer system which runs too many conventional agents will experience drastically reduced performance and a noticeably slower boot time. The reason behind such a reduction in performance is that continuously-running conventional agents continually require memory and processor resources. A user on the computer system typically has little control over how such memory and processor resources are prioritized; because priority typically goes to the conventional agents performing very important functions, the computer system is inherently limited in memory and processor resources by such conventional agents.

Further, conventional agents' use of the memory and processor resources is inefficient. Many conventional agents running concurrently on a computer system share common code for running as services or daemons. Because the agents are implemented as executable files and occupy separate memory spaces, there is much duplication of such code which results in further inefficient use of memory resources. Additionally, some agents have components, some of which run continuously, while others run once during a user session; components with one-time functionality occupy valuable memory space while being idle.

In contrast to conventional agents which make inefficient use of memory and processor resources and reduce computer system performance, an improved technique implements agents as dynamically linked libraries to run within host processes controlled by an executable agent manager. The agent manager runs as a service or daemon continuously after being loaded into the memory of a computer system. Information concerning agents that are configured to carry out tasks on the computer system is stored in a database accessible to the agent manager. When a task that a particular agent is configured to carry out needs to be done, the agent manager assigns an executable host process to run the agent. The agent manager then sends start and stop commands to the host process to load and halt the agent, respectively.

Advantageously, the improved technique makes significant memory and processor resources on a computer system available by replacing many services or daemons with a single service or daemon. The agents are implemented as lightweight dynamically linked libraries, and code used to execute a task only uses memory and processor resources as long as it takes for the agent to execute the task. Also, by being implemented as dynamically-linked libraries, agents may share address spaces, eliminating the need for duplicate code and saving memory. Further, by implementing agents as lightweight dynamically linked libraries, particular functionality of each agent can be isolated; an agent with both continuous and one-time functions may be separated into a continually-running agent and a one-time functioning agent. In this way, idle code does not occupy valuable memory resources, and the computer system has improved performance.

One embodiment of the improved technique is directed to a method of running a set of agents. The method includes loading an agent manager as a daemon in the electronic computing apparatus, the agent manager being constructed and arranged to insert and remove agents into a memory of the electronic computing apparatus. The method also includes, for each agent of the set of agents, assigning, by the agent manager, an executable host process running on the electronic computing apparatus to the agent, the agent being configured as a dynamically linked library. The method further includes sending, via the agent manager, a start command to the assigned host process, the host process being configured to load the agent upon receipt of the start command from the agent manager. The method further includes sending, via the agent manager, the stop command to the assigned host process, the host process being configured to halt the agent upon receipt of the stop command from the agent manager.

Additionally, some embodiments of the improved technique are directed to a system for running a set of agents. The system includes a network interface coupled to a network, a memory and processor coupled to the memory, the processor configured to carry out the method of running a set of agents.

Furthermore, some embodiments of the improved technique are directed to a computer program product having a non-transitory computer readable storage medium which stores code including a set of instructions to carry the method of running a set of agents.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique implements agents as dynamically linked libraries to run within host processes controlled by an executable agent manager. The agent manager runs as a service or daemon continuously after being loaded into the memory of a computer system. Information concerning agents that are configured to carry out tasks on the computer system is stored in a database accessible to the agent manager. When a task that a particular agent is configured to carry out needs to be done, the agent manager assigns an executable host process to run the agent. The agent manager then sends start and stop commands to the host process to load and halt the agent, respectively.

Advantageously, the improved technique makes significant memory and processor resources on a computer system available by replacing many services or daemons with a single service or daemon. The agents are implemented as lightweight dynamically linked libraries and code used to execute a task only uses memory and processor resources as long as it takes for the agent to execute the task. Also, by being implemented as dynamically-linked libraries, agents may share address spaces, eliminating the need for duplicate code and saving memory. Further, by implementing agents as lightweight dynamically linked libraries, particular functionality of each agent can be isolated; an agent with both continuous and one-time functions may be separated into a continually-running agent and a one-time functioning agent. In this way, idle code does not occupy valuable memory resources, and the computer system has improved performance.

Figure 1:
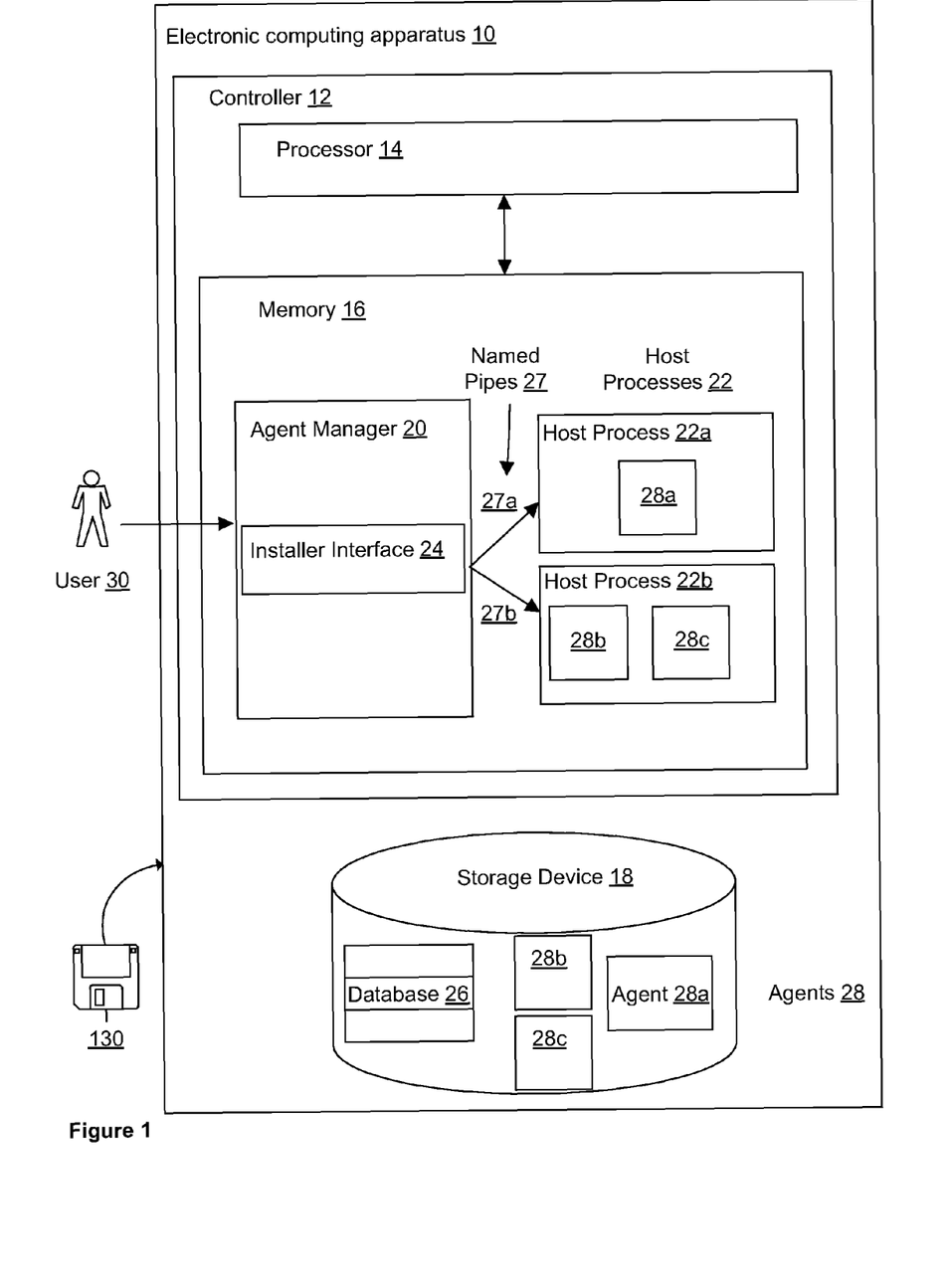
FIG. 1 is a schematic diagram illustrating an example electronic computing apparatus for carrying out the improved technique.

FIG. 1 illustrates an example electronic computing apparatus 10 for carrying out the improved technique. Electronic computing apparatus 10 includes controller 12, which in turn includes processor 14 and memory 16. Electronic computing apparatus 10 also includes storage device 18.

Memory 16 is configured to store code associated with agent manager 20, as well as various host processes 22a, 22b, . . . (host processes 22). Memory 16 also stores code associated with agents 28a, 28b, 28c, . . . , (agents 28) as the agents 28 are needed. Memory 16 generally takes the form of, e.g., random access memory, flash memory, system memory, cache memory, ROM, volatile memory, or non-volatile memory.

Agent manager 20 is configured to assign agents 28 to executable host processes 22 in which the agents 28 implemented as dynamically-linked libraries can run. Agent manager 20 is implemented as an executable and is run as a service or a daemon. In some arrangements, agent manager 20 is loaded into memory 16 at boot time. Agent manager 20 includes installer interface 24 and named pipes 27a and 27b (named pipes 27).

Host processes 22 are configured to run agents 28 upon receipt of a start message from agent manager 20. Host processes 22 are further configured to halt agents 28 upon receipt of a stop message from agent manager 20. In some arrangements, host processes, such as host process 22a, are configured to run a single agent, e.g., 28a. In other arrangements, host processes, such as host process 22b, are configured to run multiple agents.

Named pipes 27 are created by agent manager 20 to create a connection to host processes 22. Named pipes 27 act as a conduit over which commands from agent manager 50 are sent to respective host processes (i.e., named pipe 27a to host process 22a, named pipe 27b to host process 22b).

Agents 28 are configured to perform various tasks within electronic computing apparatus 10 autonomously; that is, without the intervention of a user 30. As mentioned above, agents 28 are implemented as dynamically-linked libraries and, as such, are run within a host process 22.

Installer interface 24 is configured to receive input from user 30 concerning configuration data for agents 28. Installer interface 24 is also configured to add and delete entries from database 26 stored on storage device 18, each of which correspond to one of the agents 28.

Processor 14 takes the form of, but is not limited to, Intel or AMD-based MPUs, a CPU, dedicated circuitry, etc., and can include a single or multi-cores each running single or multiple threads. Processor 14 is coupled to memory 16 and is configured to execute instructions stored in memory 16.

Storage device 18 is provided to store database 26 and dynamically-linked library files representing agents 28.

Database 26 is configured to store information concerning agents 28. Further detail concerning entries of database 26 is described below with respect to FIG. 2.

Figure 2:
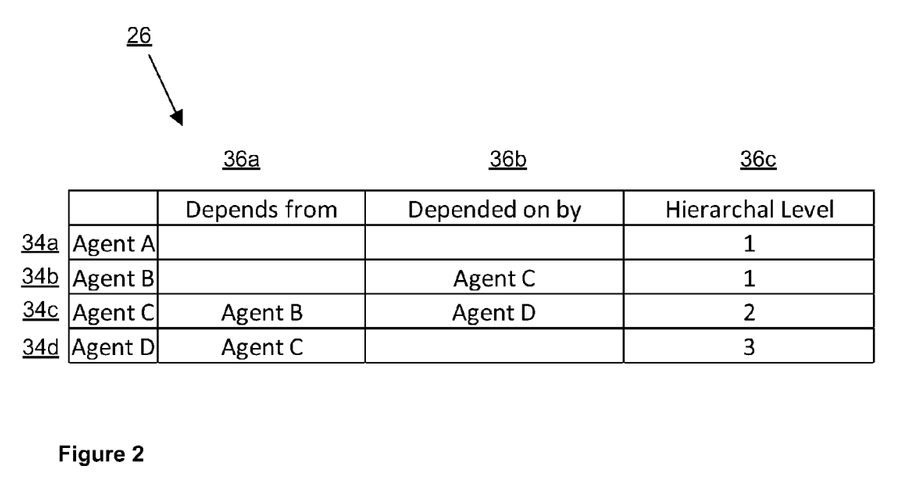
FIG. 2 is a diagram illustrating entries of a database stored within the example electronic computing apparatus shown in FIG. 1.

FIG. 2 illustrates an example instance of database 26, which contains four entries 34a, 34b, 34c, 34d (entries 34), corresponding to details from four respective agents: Agent A, Agent B, Agent C, and Agent D. Such agents 28 possess certain dependencies; in this case, Agent C requires Agent B to be running in order to run. That is, Agent C depends on Agent B. Further, Agent B depends from Agent C, so that Agent C occupies a middle position in a hierarchy.

Each entry 34 of database 36 includes fields 36a, 36b, and 36c (fields 36) that describe the dependence hierarchy of the agents 28 listed in entries 34. Further fields of each entry 34 include a location in memory 16 (see FIG. 1) of the code belonging to the corresponding agent 28.

In some arrangements, database 26 includes a field containing a flag signifying whether the agent 28 corresponding to an entry 34 is waiting to run within a host process 27. Such a flag is useful when, for example, an agent 28 represents a cyclical process that periodically is started and halted throughout a single boot session.

Figure 3:
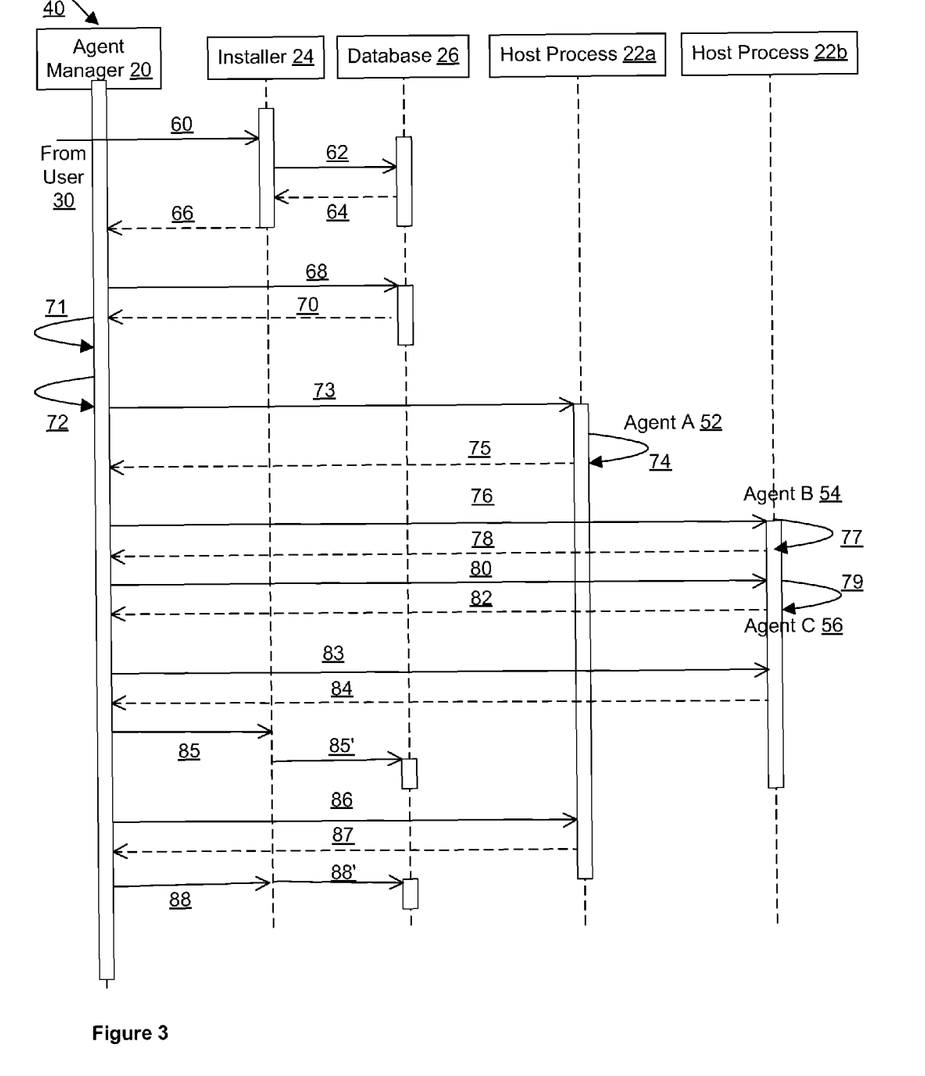
FIG. 3 is a sequence diagram illustrating loading and unloading of agents within the example electronic computing apparatus shown in FIG. 1.

FIG. 3 is a Universal Modeling Language (UML) sequence diagram illustrating the example operation 40 of electronic computing apparatus 10. The components of operation 40 include agent manager 20, installer interface 24, database 26, and a set of host processes 22, represented here by host processes 22a and 22b.

In FIG. 3, it is assumed that electronic computing apparatus 10 is operating and that agent manager 20 is loaded into memory 16 (see FIG. 1) and is running on processor 14 (see FIG. 1). In some arrangements, agent manager 20 is loaded into memory 16 during a boot process of electronic computing apparatus 10.

Installer interface 24 provides an interface to a user (e.g., user 30, see FIG. 1) to provide configuration information with regard to the set of agents 28 (see FIG. 1). For example, installer interface 24 allows user 30 to specify, via a request through the interface, that Agent A 52, Agent B 54, and Agent C 56 be executed within electronic computing apparatus 10. In some arrangements, user 30 further specifies through the interface configuration information associated with the agents 28. Along these lines, such configuration information includes dependence information, such as a specification that Agent C 56 depends on Agent B 54.

While agent manager 20 is running, installer interface 24, upon receiving the configuration information from the user, performs a read operation 62 on database 26 based on the information received through the interface concerning the agents 28. When user 30 requests that Agent A 52, Agent B 54, and Agent C 56 be executed within electronic computing apparatus 10, read operation 62 includes verifying whether entries 34 (see FIG. 2) of database 26 correspond to any of Agent A 52, Agent B 54, and Agent C 56. If entries 34 do not correspond to an agent, installer interface 24 adds a new entry 34 to database 26, corresponding to the agent and including configuration data for the agent. If a particular entry 34a corresponds to an Agent A, for example, installer interface 24 updates entry 34a with any configuration information specified in the request.

Database 26, upon accepting changes from the read operation, sends a confirmation message 64 to the installer interface 24 that the changes were accepted. In some arrangements, upon receiving the confirmation message 64, installer interface 24 sends a confirmation message 66 to agent manager 62 informing agent manager 20 of changes in database 26.

Subsequently, agent manager 20 performs a read operation 68 on database 26 as part of its normal run sequence. As a result of the read operation 68, agent manager 20 selects agents to load into memory; along these lines, upon receiving an acknowledgment 70 that read operation 68 succeeded, agent manager 20 builds a list of agents, e.g., Agent A 52, Agent B 54, and Agent C 56, in memory 16.

In some arrangements, agent manager 20 applies an algorithm 71 to the list of agents that arranges the agents according to a hierarchy determined by dependency. For example, because Agent C 56 depends on Agent B 54, a result of the algorithm pairs Agent C 56 with Agent B 54.

Agent manager 20 then prepares to run the agents 28 in the list by assigning to them host processes in which the agents will run. For example, agent manager 20 sends a signal 72 to processor 14 assigning host process 22a to Agent A 52 (see FIG. 1). In some arrangements, signal 72 includes instructions to processor 14 to create host process 22a when there is no host process available that is capable of running Agent A 52. In other arrangements, signal 72 includes instructions to processor 14 to assign already-existing host process 22a to Agent A 52.

It should be understood that agent manager 20 in sending signal 72 to processor 14, establishes named pipes 27 for communicating with host processes. For example, agent manager 50 establishes a named pipe 27a to host process 22a over which agent manager 50 sends commands to host process 22a.

To this effect, agent manager 20 issues a start command 73 that includes a command to load Agent A 52 into host process 22a over named pipe 27a. By loading Agent A 52 into host process 22a, agent manager 50 is delivering a pointer to Agent A 52 to host process 22a, thereby giving host process 22a the location in memory 16 of the code within Agent A 52 for performing the tasks for which Agent A 52 was created. Once Agent A 52 is loaded into host process 22a, host process 22a performs an execution 74 of the instructions produced by the code within Agent A 52. In some arrangements, host process 22a sends a confirmation message 75 to agent manager 20 containing a notification that Agent A is running within host process 22a.

At some point after issuing start command 73, agent manager 20 issues a stop command 86 to host process 22a over named pipe 27a. Stop command 86 is configured to halt any actively running process by Agent A 52, and unload Agent A from host process 22a. After agent manager 20 receives an acknowledgment message 87 from host process 22a stating that stop command 86 successfully executed, agent manager 20, in some arrangements may issue a delete command 88 to installer interface 24, which in turn performs a delete operation 88' on database 26. A result of delete operation 88' is a deletion of the entry 34a (see FIG. 2) of database 26 corresponding to Agent A 52.

It should be understood that the stop command 86 and delete command 88 remove Agent A 52 from memory 16 once the task performed by Agent A 52 has been accomplished. Such capability is especially advantageous if Agent A includes run-once code (that is, Agent A has code that performs a single task and then becomes idle), as such code does not occupy space in memory 16 during a period of idleness. Further, continuously operating code can be stopped while executing as needed.

It should also be understood that, while host process 22a hosts a single agent (Agent A 52), other host processes are configured to host multiple agents. For example, in order for host process 22b to run Agent C 56, it must also be configured to run Agent B 54 simultaneously, as Agent C 56 depends on Agent B 54. To this effect, assume that agent manager 20 has already assigned host process 22b to Agent B 54 and Agent C 56. Agent manager 20 issues a start command 76 that includes a command to load Agent B 54 into host process 22b over named pipe 27b in a similar manner as described above with respect to start command 73. Once Agent B 54 is loaded into host process 22b, host process 22b performs an execution 77 of the instructions produced by the code within Agent B 54. In some arrangements, host process 22a sends a confirmation message 78 to agent manager 20 containing a notification that Agent B 54 is running within host process 22b. Further, agent manager 20 issues a start command 80 that includes a command to load Agent C 56 into host process 22b over named pipe 27b in a similar manner as described above with respect to start command 76. Note that Agent C 56 cannot be started until Agent B 54 is started due to the dependence relationship between Agent B 54 and Agent C 56. Once Agent C 56 is loaded into host process 22b, host process 22b performs an execution 79 of the instructions produced by the code within Agent C 56. In some arrangements, host process 22b sends a confirmation message 82 to agent manager 20 containing a notification that Agent C 56 is running within host process 22b.

At some point after issuing start commands 76 and 80, agent manager 20 issues a stop command 83 to host process 22b over named pipe 27b. Stop command 83 is configured to cause host process 22b to halt any actively running process by Agent B 54 (and, because of dependence, Agent C 56), and unload Agent B 54 and Agent C 56 from host process 22b. In some arrangements, after agent manager 20 receives an acknowledgment message 84 from host process 22a stating that stop command 83 successfully executed, agent manager 20 issues a delete command 85 to installer interface 24, which in turn causes installer interface 24 to perform a delete operation 85' on database 26. A result of delete operation 85' is a deletion of entries 34b and 34c of database 26, corresponding to Agent B 54 and Agent C 56, respectively.

Figure 4:
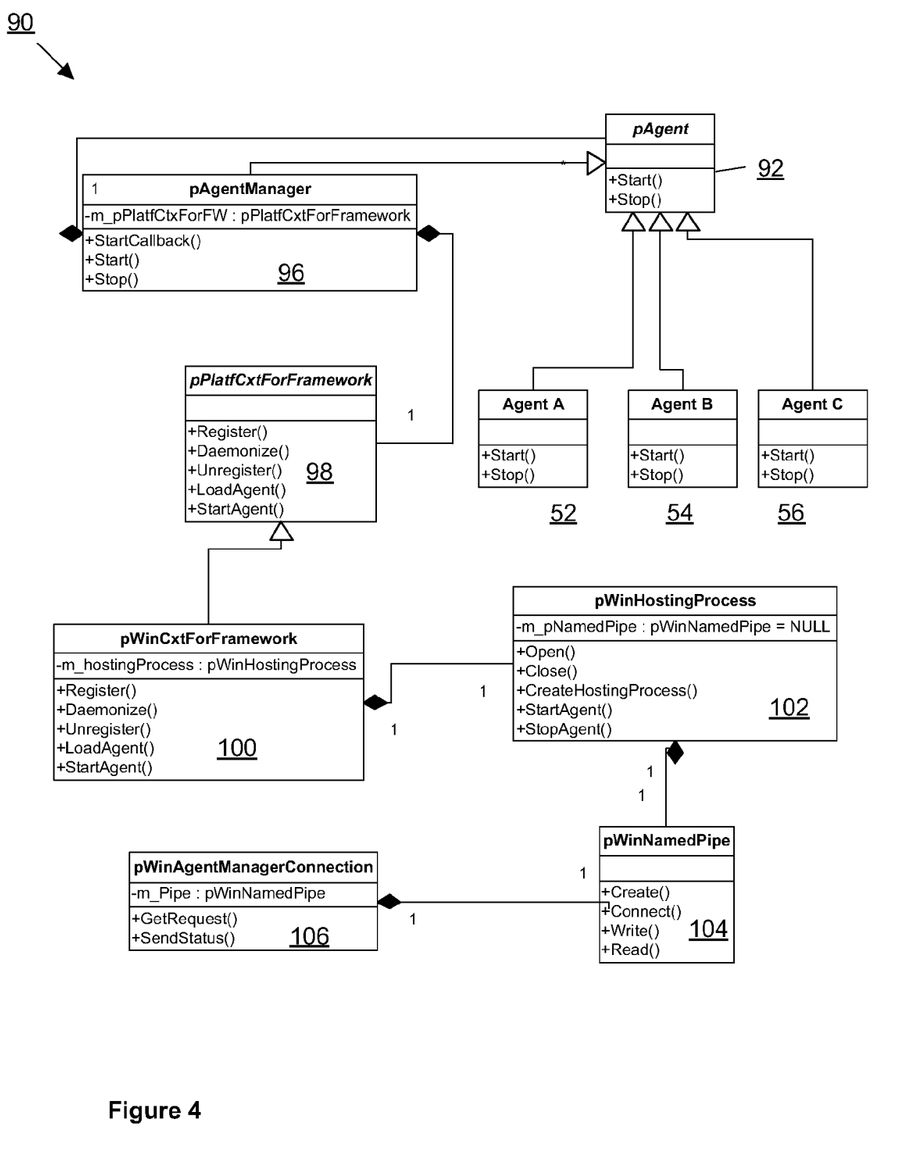
FIG. 4 is a class diagram illustrating an instantiation of an agent class within the example electronic computing apparatus shown in FIG. 1.
Figure 5:
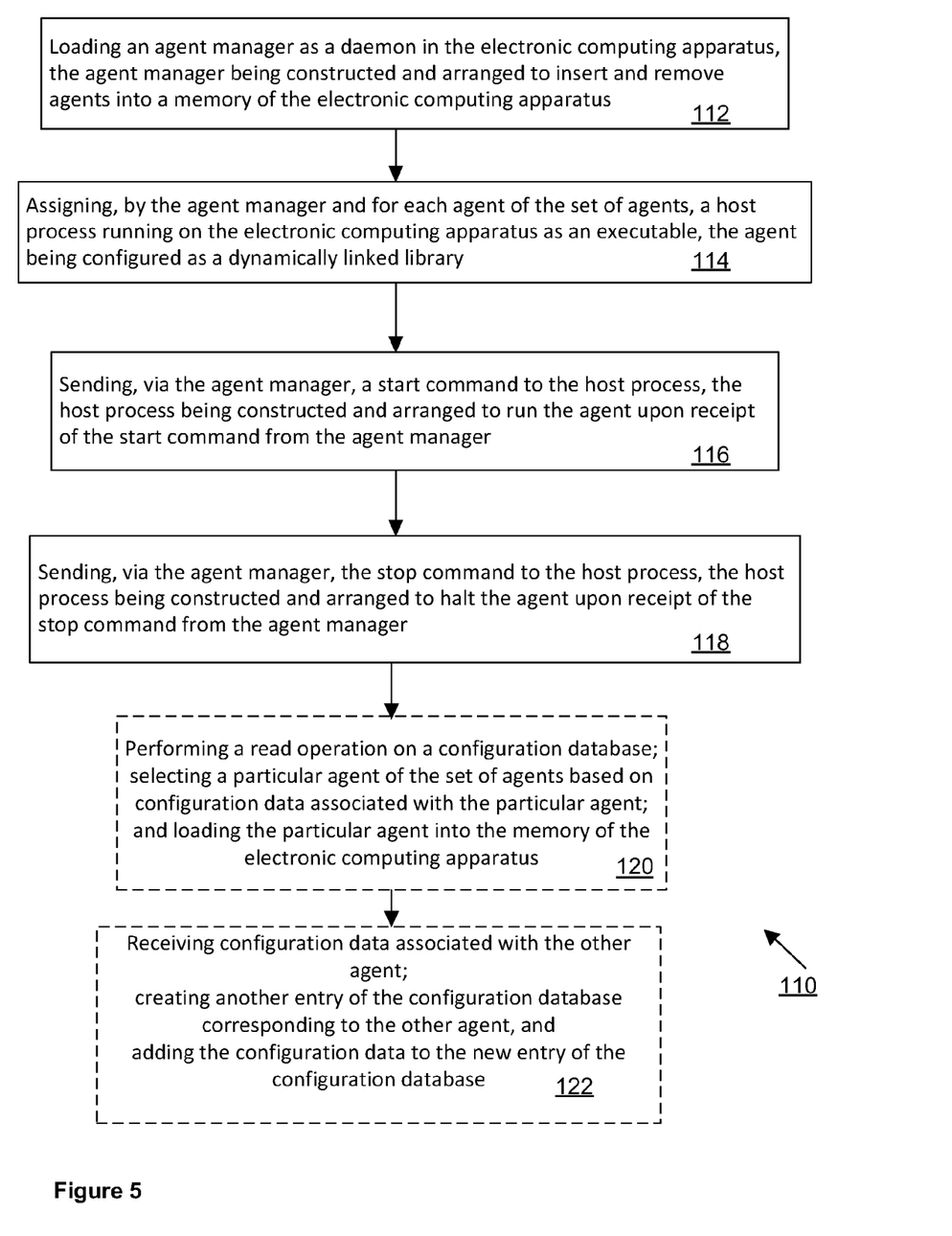
FIG. 5 is a flow chart illustrating a method of carrying out the improved technique within the example electronic computing apparatus shown in FIG. 1.

Further details of the invocation of the agents 28 are presented with respect to FIGS. 4 and 5.

FIG. 4 includes a UML class diagram 90 illustrating relationships between a class pAgentManager 96 representing agent manager 20 (see FIG. 1) and other classes representing host processes 22, agents 28, and named pipes 27, in this case abstract class pPlatfCtxForFramework 98 and abstract class pAgent 92. pAgentManager 96 includes a member m_pPlatfCtxForFW of type pPlatfCtxForFramework 98 and is a subclass of pAgent 92.

Abstract class pAgent 92 includes methods Start( ) and Stop( ) which begin and halt execution of code used to carry out tasks assigned to the respective agent. Agent A 52, Agent B 54, and Agent C 56 is a subclass of pAgent 92 and include the same methods as pAgent 92.

Abstract class pPlatfCtxForFramework 98 encompasses infrastructure including host processes 22 and named pipes 27 through which agent manager 20 controls the agents 28.

Subclasses of this class are specific to particular operating systems, as will be described below. Each such subclass includes a set of methods. Register( ) and Unregister( ) load and unload, respectively, host processes into and from memory 16. Daemonize( ) runs a host process as a service or a daemon. LoadAgent( ) loads an agent into the memory space defined by the instantiated host process, while StartAgent( ) executes the code associated with the agent.

An subclass of pPlatfCtxForFramework 98 is provided in FIG. 4 as pWinCxtForFramework 100, which represents a Microsoft Windows implementation. In addition to the methods defined in the abstract class 98, pWinCxtForFramework 100 includes at least a member m_hostingProcess of type pWinHostingProcess 102, which represents a host process 27 within the Microsoft Windows environment.

pWinHostingProcess 102 includes several methods. Open( ) and Close( ) open and close, respectively, a connection to agent manager 20 over a named pipe 27. CreateHostingProcess( ) is a constructor which creates an instance of the class pWinHostingProcess 102. StartAgent( ) and StopAgent( ) start and stop execution of an agent within the instantiated host process 22. pWinHostingProcess 102 further includes a member, m_pWinNamedPipe, initially set to NULL (i.e., no connections) of type pWinNamedPipe 104, which representa a named pipe.

pWinNamedPipe 104 includes several methods. Create( ) creates an endpoint of the named pipe 27. Connect( ) creates a connection between agent manager 20 and a host process 22. Write( ) and Read( ) write to the named pipe 27 and read from the named pipe 27, respectively. pWinNamedPipe 104 is also included within class pWinAgentManagerConnection 106, which manages connections to and from agent manager 20. In addition to a member of type pWinNamedPipe 104, pWinAgentManagerConnection 106 includes two methods: GetRequest( ) which reads from the named pipe 27 and SendStatus( ) which sends the status to the agent manager 20 on the named pipe 27. FIG. 5 illustrates a method 110 of running a set of agents. In step 112, an agent manager is loaded as a daemon in the electronic computing apparatus, the agent manager being constructed and arranged to insert and remove agents into a memory of the electronic computing apparatus. In step 114, for each agent, an executable host process running on the electronic computing apparatus is assigned to the agent, the agent being configured as a dynamically linked library. In step 116, a start command is sent to the assigned host process, the host process being configured to load the agent upon receipt of the start command from the agent manager. In step 118, the stop command is sent to the assigned host process, the host process being configured to halt the agent upon receipt of the stop command from the agent manager.

In step 112, class pAgentManager 96 is created (i.e., its constructor is run by an external process, e.g., a boot process). pAgentManager then registers a Windows platform framework class pWinCxtForFramework 100 and runs the Daemonize( ) method to run as a service.

In step 114, pAgentManager 96 runs CreateHostingProcess( ) to create a hosting process pWinHostingProcess 102 in which to run an agent 28. pAgentManager 96 opens a named pipe pWinNamedPipe 104 by running Open( ) within pWinHostingProcess 102.

In step 116, pAgentManager 96 runs LoadAgent( ) to load Agent A 52 into pWinHostingProcess 102 over the named pipe pWinNamedPipe 104. pAgentManager 96 then sends a command to pWinHostingProcess 102 over the named pipe pWinNamedPipe 104 to start running Agent A 52 by running StartAgent( ).

In step 118, pAgentManager 96 runs StopAgent( ) to halt Agent A 52.

In some arrangements, the method 110 further includes steps 120 and 122. In step 120, a read operation is performed on a configuration database, a particular agent of the set of agents is selected based on configuration data associated with the particular agent, and the particular agent is loaded into the memory of the electronic computing apparatus. In step 122, configuration data associated with another agent is received, another entry of the configuration database corresponding to the other agent is created, and the configuration data is added to the new entry of the configuration database.

While various embodiments of the invention have been particularly shown and described, it will be understood by those skilled in the art that various changes in form and details may be made therein without departing from the spirit and scope of the invention as defined by the appended claims.

For example, while a specific example dealt with the agent manager 20 running as a service within a Microsoft Windows® environment, agent manager 20 can also be run as a daemon within a Unix or Linux environment, or any other operating system in use.

Also, while example described above only illustrated 2 named pipes 27 and three agents 28, the improved techniques are valid for any number of named pipes and agents.

Furthermore, it should be understood that some embodiments are directed to electronic computing apparatus 10 which is constructed and arranged to run a set of agents. Some embodiments are directed to a process of running a set of agents. Also, some embodiments are directed to a computer program product which enables computer logic to run a set of agents.

In some arrangements, electronic computing apparatus 10 is implemented by a set of processors or other types of control/processing circuitry running software. In such arrangements, the software instructions can be delivered to electronic device 14 and electronic computing apparatus 10 in the form of a computer program product 130 (see FIG. 1) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. In an electronic computing apparatus, a method of running a set of agents, comprising:
   loading an agent manager as a daemon in the electronic computing apparatus, the agent manager being constructed and arranged to insert and remove agents into a memory of the electronic computing apparatus;
   for each agent of the set of agents:
   assigning, by the agent manager, an executable host process running on the electronic computing apparatus to the agent, the agent being configured as a dynamically linked library; sending, via the agent manager, a start command to the assigned host process, the host process being configured to load the agent upon receipt of the start command from the agent manager; and sending, via the agent manager, the stop command to the assigned host process, the host process being configured to halt the agent upon receipt of the stop command from the agent manager;

wherein the electronic computing apparatus includes a storage device, wherein the agent manager includes a configuration database stored on the storage device, the configuration database having a set of entries, each entry of the set of entries including configuration data associated with an agent of the set of agents, wherein the method further comprises:

performing a read operation on the configuration database;

selecting a particular agent of the set of agents based on configuration data associated with the particular agent; and loading the particular agent into the memory of the electronic computing apparatus;

wherein the configuration data associated with the particular agent includes a first list of agents of the set of agents from which the particular agent depends and a second list of agents of the set of agents that depend on the particular agent, agents of the second list of agents being assigned to the same host process as the particular agent, and the particular agent being assigned to the same host process as agents of the first list of agents, and wherein performing the read operation on the configuration database includes: assigning the particular agent to a particular hierarchal level;

assigning agents of the first list of agents to a first hierarchal level, the particular hierarchal level being below the first hierarchal level; and assigning agents of the second list of agents being assigned to a second hierarchal level, the particular hierarchal level being above the second hierarchal level.

2. A method according to claim 1, wherein the agent manager further includes an installer interface configured to insert another agent onto the storage device, and wherein the method further comprises:

receiving configuration data associated with the other agent, creating another entry of the configuration database corresponding to the other agent, and adding the configuration data to the new entry of the configuration database.

3. A method according to claim 2, wherein the installer interface is further configured to remove the other agent from the storage device, and wherein the method further comprises: removing the entry of the configuration database corresponding to the other agent.

4. A method as in claim 3, wherein the other agent is selected from the first list of agents;

wherein removing the entry of the configuration database corresponding to the other agent includes:

removing the entry of the configuration database corresponding to the particular agent.

5. A method according to claim 1, wherein assigning the executable host process running on the electronic system to the agent includes:

generating the host process in response to the read operation being performed on the configuration database.

6. A method according to claim 5, wherein the installer interface is further constructed and arranged to identify other agents to be run alongside the particular agent in the hosting process, and wherein sending the start command to the host process includes: providing instructions to the host process to run the particular agent and the other agents within the host process.

7. A method according to claim 6, wherein:

assigning the executable host process running on the electronic system to the agent further includes:

identifying, from the configuration database, that the particular agent is arranged to be halted first, and sending the stop command to the host process includes:

providing instructions to the host process to halt the particular agent.

8. A method according to claim 7, wherein the particular agent includes one-time functionality instructions constructed and arranged to run once, wherein the configuration data associated with the particular agent includes a functionality identifier constructed and arranged to identify the particular agent as having one-time functionality;

wherein sending the stop command to the host process further includes:

removing the particular agent from the memory of the electronic computing apparatus, and removing the entry of the configuration database corresponding to the particular agent.

9. A method according to claim 1, wherein each agent of the set of agents corresponds to an instance of a subclass of an abstract class, the abstract class being contained within a manager class corresponding to the agent manager, the manager class including a constructor arranged to generate the instance of the subclass to which the agent corresponds; and wherein sending the start command to the host process includes: running the constructor within the container class.

10. A method as in claim 1, wherein sending the start command to the assigned host process includes:

issuing a command to the assigned host process to load at least one agent from the first list of agents, and after issuing the command to the assigned host process to load at least one agent from the first list of agents, issuing a command to the assigned host process to load the particular agent.

11. An electronic computing apparatus constructed and arrange to run a set of agents, comprising:

memory, and a controller including controlling circuitry coupled to the memory, the controlling circuitry being constructed and arranged to:

load an agent manager as a daemon in the electronic computing apparatus, the agent manager being constructed and arranged to insert and remove agents into the memory of the electronic computing apparatus;

for each agent:

assign, by the agent manager, an executable host process running on the electronic computing apparatus to the agent, the agent being configured as a dynamically linked library;

send, via the agent manager, a start command to the assigned host process, the host process being configured to load the agent upon receipt of the start command from the agent manager; and send, via the agent manager, the stop command to the assigned host process, the host process being configured to halt the agent upon receipt of the stop command from the agent manager;

wherein the electronic computing apparatus includes a storage device, wherein the agent manager includes a configuration database stored on the storage device, the configuration database having a set of entries, each entry of the set of entries including configuration data associated with an agent of the set of agents,
wherein the method further comprises:
performing a read operation on the configuration database;
selecting a particular agent of the set of agents based on configuration data associated with the particular agent; and
loading the particular agent into the memory of the electronic computing apparatus;
herein the configuration data associated with the particular agent includes a first list of agents of the set of agents from which the particular agent depends and a second list of agents of the set of agents that depend on the particular agent, agents of the second list of agents being assigned to the same host process as the particular agent, and the particular agent being assigned to the same host process as agents of the first list of agents, and
wherein performing the read operation on the configuration database includes:
assigning the particular agent to a particular hierarchal level;
assigning agents of the first list of agents to a first hierarchal level, the particular hierarchal level being below the first hierarchal level; and
assigning agents of the second list of agents being assigned to a second hierarchal level, the particular hierarchal level being above the second hierarchal level.

12. An electronic computing apparatus according to claim 11, wherein the agent manager further includes an installer interface configured to insert another agent onto the storage device, and wherein the method further comprises:
receiving configuration data associated with the other agent,
creating another entry of the configuration database corresponding to the other agent, and adding the configuration data to the new entry of the configuration database.

13. An electronic computing apparatus according to claim 12, wherein the installer interface is further configured to remove the other agent from the storage device, and wherein the method further comprises: removing the entry of the configuration database corresponding to the other agent.

14. An electronic computing apparatus according to claim 11, wherein assigning the executable host process running on the electronic system to the agent includes: generating the host process in response to the read operation being performed on the configuration database.

15. An electronic computing apparatus according to claim 14, wherein the installer interface is further constructed and arranged to identify other agents to be run alongside the particular agent in the hosting process, and wherein sending the start command to the host process includes: providing instructions to the host process to run the particular agent and the other agents within the host process.

16. An electronic computing apparatus according to claim 15, wherein assigning the executable host process running on the electronic system to the agent further includes:
identifying, from the configuration database, that the particular agent is arranged to be halted first, and
wherein sending the stop command to the host process includes:
providing instructions to the host process to halt the particular agent.

17. An electronic computing apparatus according to claim 16, wherein the particular agent includes one-time functionality instructions constructed and arranged to run once, wherein the configuration data associated with the particular agent includes a functionality identifier constructed and arranged to identify the particular agent as having one-time functionality;
wherein sending the stop command to the host process further includes:
removing the particular agent from the memory of the electronic computing apparatus,
and removing the entry of the configuration database corresponding to the particular agent.

18. A computer program product having a non-transitory, computer-readable storage medium which stores code to run a set of agents on an electronic computing apparatus, the code including instructions to:
load an agent manager as a daemon in the electronic computing apparatus, the agent manager being constructed and arranged to insert and remove agents into a memory of the electronic computing apparatus;
for each agent:
assign, by the agent manager, an executable host process running on the electronic computing apparatus to the agent, the agent being configured as a dynamically linked library;
send, via the agent manager, a start command to the assigned host process, the host process being configured to load the agent upon receipt of the start command from the agent manager; and
send, via the agent manager, the stop command to the assigned host process, the host process being configured to halt the agent upon receipt of the stop command from the agent manager;
wherein the electronic computing apparatus includes a storage device, wherein the agent manager includes a configuration database stored on the storage device, the configuration database having a set of entries, each entry of the set of entries including configuration data associated with an agent of the set of agents,
wherein the code includes further instructions to:
perform a read operation on the configuration database;
select a particular agent of the set of agents based on configuration data associated with the particular agent; and
load the particular agent into the memory of the electronic computing apparatus;
wherein the configuration data associated with the particular agent includes a first list of agents of the set of agents from which the particular agent depends and a second list of agents of the set of agents that depend on the particular agent, agents of the second list of agents being assigned to the same host process as the particular agent, and the particular agent being assigned to the same host process as agents of the first list of agents, and
wherein performing the read operation on the configuration database includes:
assigning the particular agent to a particular hierarchal level;
assigning agents of the first list of agents to a first hierarchal level, the particular hierarchal level being below the first hierarchal level; and
assigning agents of the second list of agents being assigned to a second hierarchal level, the particular hierarchal level being above the second hierarchal level.

\* \* \* \* \*